Figure 1:
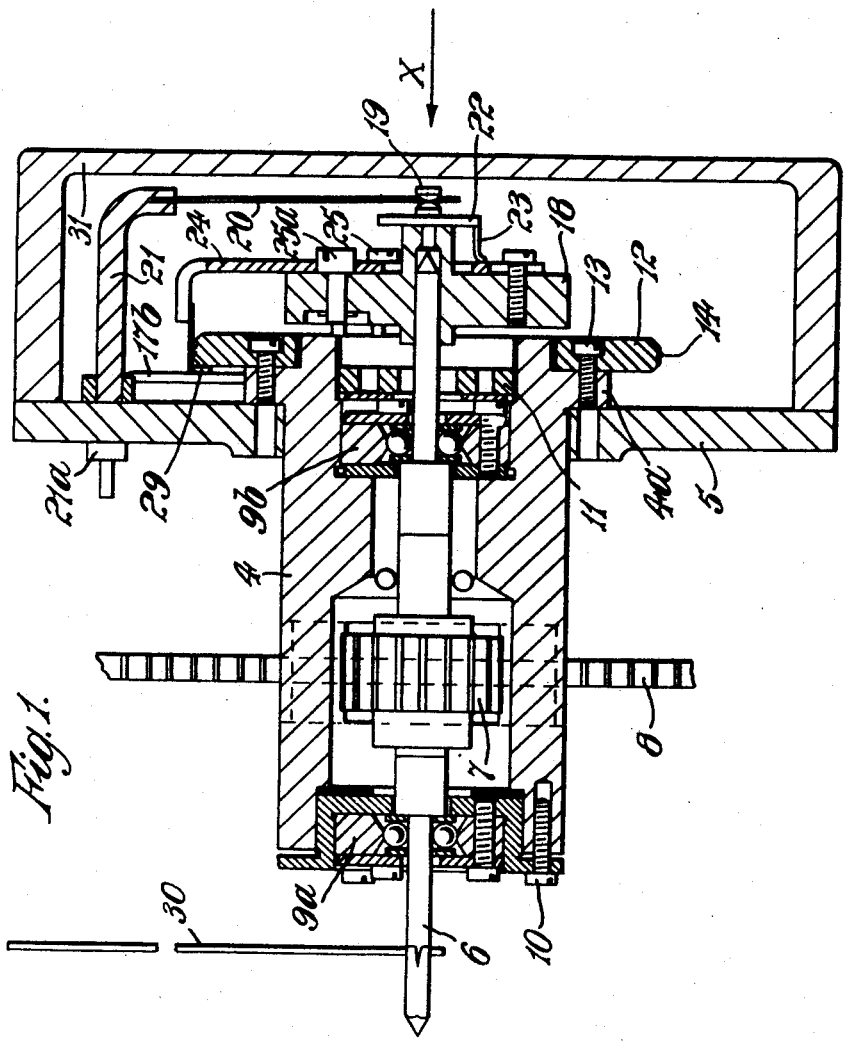

July 12, 1960

J. M. CHILTON 2,945,197

PRECISION POTENTIOMETER

Filed Aug. 4, 1958

2 Sheets-Sheet 1

INVENTOR
JOHN MOORHOUSE CHILTON
Norris & Bateman
ATTORNEYS

July 12, 1960   J. M. CHILTON   2,945,197
PRECISION POTENTIOMETER
Filed Aug. 4, 1958   2 Sheets-Sheet 2
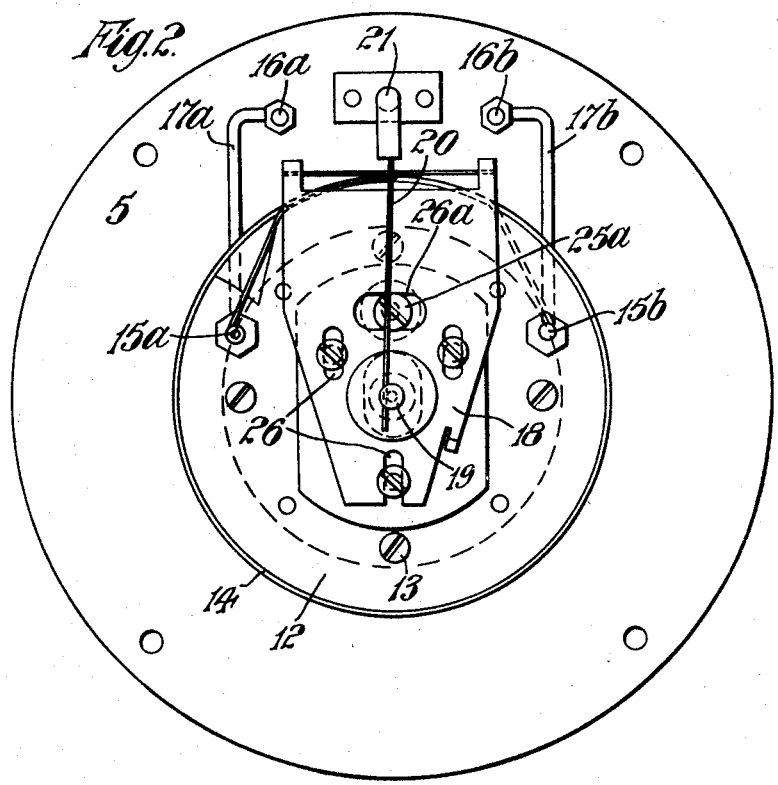
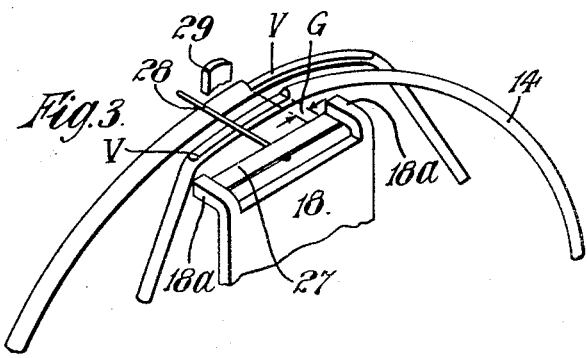
INVENTOR
JOHN MOORHOUSE CHILTON
Norris & Bateman
ATTORNEYS

United States Patent Office 2,945,197
Patented July 12, 1960

2,945,197
PRECISION POTENTIOMETER

John Moorhouse Chilton, Harborne, Birmingham, England, assignor to W. & T. Avery Limited, Birmingham, England, a British company Filed Aug. 4, 1958, Ser. No. 752,957

5 Claims. (Cl. 338—143)

This invention relates to improvements connected with rotary type potentiometers and has for its object to provide a low resistance rotary type potentiometer of low torque and high precision characteristics which is particularly suited for use in connection with weighing apparatus in order to provide an electrical resistance of a magnitude accurately proportionate to the weight of a load imposed on the weighing apparatus.

The invention consists of a rotary type potentiometer comprising a former; a single complete helical turn of resistance wire mounted on the former; terminal means for connecting the ends of the resistance wire to a source of electricity; a wiper mechanism including a spindle mounted on the axis of the turn of resistance wire for rotation through 360°, a finger carried by said spindle and adapted for spring biased contact with the turn of resistance wire during rotation of the spindle, and means involving a collector and brush for establishing electrical connection to the wiper finger; and means for preventing contact of the wiper finger simultaneously with two overlapping sections of the resistance wire throughout the permitted 360° movement of the wiper finger over the resistance wire.

Preferred means for carrying the present invention into practice will now be described with reference to the accompanying drawings wherein;

Figure 1 is a longitudinal sectional elevation of a potentiometer in accordance with the invention, Figure 2 is an end elevation seen in the direction X of Figure 1, but with the cover of the potentiometer removed, and Figure 3 is a schematic drawing illustrating certain of the parts of the potentiometer seen in Figures 1 and 2.

The potentiometer seen in the drawings comprises a generally cylindrical body 4 which is adapted to be mounted on the frame of the weighing apparatus (not shown) in any convenient manner and is furnished with a flanged end 4a to which is secured an annular base plate 5 composed of an insulating material. A bore furnished in the body 4 accommodates an indicator spindle 6 which is rotatably mounted on the axis of the body by means of screws 10 and a screw threaded locking ring 11 respectively. The spindle 6 is coupled to a load responsive part of the weighing apparatus through the agency of a pinion 7 secured to the spindle 6 and a rack 8 forming part of the weighing mechanism, the body 4 being suitably cut away in the transverse plane of the pinion to admit of the meshing of these parts.

An accurately machined annular former 12 composed of an insulating material is mounted by screws 13 on the flange 4a of the body, clearances being provided between the screws, the inner rim of the former annulus and the body flange to admit of the former being accurately positioned concentrically about the spindle 6.

The circumferential edge of the former 12 is provided with a helical groove extending over a single complete turn and two overlapping part turns which is adapted to receive a single complete turn of a precision drawn resistance wire 14 of a precious metal alloy of non-tarnishing character, say a silver/palladium alloy wire, which is wound under controlled tension in the groove and is fastened by soldering between a pair of metal pins 15a, 15b, the ends of the wire being located in the respective part turns of the circumferential groove and further grooves furnished one on each face of the former between the said circumferential groove and the pins 15a and 15b. Electrical connection is made from the pins 15a and 15b to a pair of terminals 16a and 16b furnished on the base plate 5 by means of conductors 17a and 17b.

The wiper mechanism of the potentiometer comprises a block 18 composed of insulating material secured to one end of the spindle 6 for rotation therewith and centrally provided with a metal collector ring 19 which is lightly engaged by a brush in the form of the free end of a resilient gold alloy wire 20 mounted on a conducting post 21 the foot whereof is mounted on the base plate 5 and is furnished with a terminal 21a for effecting electrical connection to the wiper. The collector ring is electrically connected through the metal plate 22 and the wire 23 to a metal bracket 24 mounted on the outer face of the block 18 by screws 25. To permit the radial adjustment of the bracket in relation to the block 18 and spindle 6 the holes 26 provided in the bracket for receiving the mounting screws are elongated as clearly seen at 26 in Figure 2 and to facilitate the adjustment operation one screw 25a is provided with an eccentric head which is located within a slot 26a so that the rotation of the screw head will gradually displace the bracket radially in relation to the block.

The outer end of the bracket 24 is gapped as clearly shown in Figure 3 to provide a pair of lugs 18a between which a metal torsion ribbon 27 is secured in tension, and a finger in the form of a short stiff gold alloy wire 28 is soldered to the centre of the ribbon to project therefrom for engagement with the resistance wire under a light pressure afforded by the torsion strip.

It will be realised that it is of importance that the wiper wire 28 should be prevented from simultaneously engaging the overlapping ends of the resistance wire to thereby short circuit the resistance, and to this end the outer segment of the cross section of the wire at each end of the turn is partially ground away as clearly indicated at V in Figure 3 to leave slightly less than a single complete helical turn of wire of circular cross section. It will be seen that a small gap G is thereby formed between the shoulders present at the ends of the ground sections so that means must be provided for preventing the wiper wire 28 from becoming trapped in this gap with the consequent danger of distortion of the wire. As seen in the drawings this difficulty may be overcome by providing a small cam shoulder 29 on the underside of the former which is adapted to lift the wire 28 from the resistance wire 14 during the traverse of the wiper wire over the cam in the region of the gap. It will be understood that the wiper mechanism is rotatable throughout 360° and has effective engagement with the resistance wire over substantially the whole of its sweep.

The wiper and resistance wire assemblies are enclosed by a cover 31 fitted on the base plate 5.

If desired the spindle 6 may be furnished with a pointer arm 30 for registration with a chart to provide a visible indication of the load applied to the weighing mechanism.

It will be appreciated that the above described precision potentiometer is of infinite resolution and of a high degree of linearity. Further the potentiometer will provide a low torque resistance to the movement of the

I claim:

1. A rotary type potentiometer comprising a cylindrical former having a helical groove formed therein; a single complete helical turn of precision drawn resistance wire having overlapping sections mounted in the groove on the former; terminal means for connecting the ends of the resistance wire to a source of electricity; a wiper mechanism including a spindle mounted on the axis of the turn of resistance wire for rotation through 360°, a finger carried by said spindle and adapted for spring contact with the turn of resistance wire during rotation of the spindle, and means involving a collector and brush for establishing electrical connection to the wiper finger; and means for preventing contact of the wiper finger simultaneously with said overlapping sections of the resistance wire throughout the permitted 360° movement of the wiper finger over the resistance wire comprising a construction at each end of the resistance wire whereby the outer segments of the wire cross section have been removed to leave slightly less than a single complete helical turn of the wire having a full diameter.

2. A rotary type potentiometer according to claim 1 wherein shoulders are provided at the junction of the wire having a full diameter and each end of reduced cross section, and cam means are provided for engaging and lifting the wiper finger out of contact with the resistance wire when the wiper finger traverses in the region of the gap to prevent the wiper finger from being trapped in said gap between said shoulders.

3. A rotary type potentiometer according to claim 1 further comprising a bracket carried by said spindle, a torsion strip carried by said spindle on which the wiper finger is mounted, the ends of said torsion strip being secured in tension on said bracket whereby the finger is biased into light contact with the resistance wire by the resistance of the torsion strip.

4. A rotary type potentiometer according to claim 1, further comprising a body member, antifriction bearings supported in said body member and means mounting said spindle in said antifriction bearings and a pinion on said spindle for meshing with a complementary part of a weighing mechanism.

5. A rotary type potentiometer according to claim 3 further comprising a block mounted on said spindle for supporting said bracket, and eccentric screw and slot means on said bracket and on said block for effecting radial adjustment of said bracket relative to the block and spindle.

References Cited in the file of this patent

UNITED STATES PATENTS

| | | |
|---|---|---|
| 2,480,995 | Armitage | Sept. 6, 1949 |
| 2,599,934 | Opocensky | June 10, 1952 |
| 2,676,226 | Mucher | Apr. 20, 1954 |
| 2,729,728 | Koenig | Jan. 3, 1956 |